(12) United States Patent
Higashitani et al.

(10) Patent No.: US 8,849,491 B2
(45) Date of Patent: Sep. 30, 2014

(54) ELECTRIC VEHICLE

(71) Applicant: Honda Motor Co., Ltd., Tokyo (JP)

(72) Inventors: Kosuke Higashitani, Wako (JP); Masanobu Asakawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 45 days.

(21) Appl. No.: 13/686,922

(22) Filed: Nov. 28, 2012

(65) Prior Publication Data

US 2013/0151049 A1 Jun. 13, 2013

(30) Foreign Application Priority Data

Dec. 9, 2011 (JP) ................. 2011-269903

(51) Int. Cl.
*B60W 10/30* (2006.01)
*G06F 17/00* (2006.01)
*G06F 19/00* (2011.01)
*B60L 15/00* (2006.01)
*B60L 7/14* (2006.01)
*B60L 1/00* (2006.01)
*B60H 1/00* (2006.01)
*B60L 11/18* (2006.01)
*B60W 30/188* (2012.01)
*B60W 10/08* (2006.01)

(52) U.S. Cl.
CPC ......... *B60W 10/08* (2013.01); *B60W 2510/305* (2013.01); *B60W 2710/086* (2013.01); *B60L 7/14* (2013.01); *B60W 2510/085* (2013.01); *B60L 1/003* (2013.01); *B60L 2240/34* (2013.01); *B60L 2250/16* (2013.01); *B60W 2510/244* (2013.01); *B60L 2250/10* (2013.01); *B60H 1/00428* (2013.01); *B60L 11/1862* (2013.01); *B60W 30/1886* (2013.01); *B60H 1/00392* (2013.01); *B60W 10/30* (2013.01); *B60L 2210/10* (2013.01)
USPC ................. 701/22; 701/36; 701/70; 701/123; 180/65.1; 180/65.265

(58) Field of Classification Search
USPC ........... 701/1, 22, 36, 69, 70, 91, 93, 99, 123, 701/29.1, 32.1, 32.9; 340/438, 439; 180/65.1, 65.21, 65.22, 65.265, 65.28, 180/65.29
See application file for complete search history.

(56) References Cited

U.S. PATENT DOCUMENTS

2012/0179319 A1* 7/2012 Gilman et al. .................. 701/22

FOREIGN PATENT DOCUMENTS

| JP | 04-368216 | 12/1992 |
|---|---|---|
| JP | 05-032121 | 2/1993 |
| JP | 08-205302 | 8/1996 |

* cited by examiner

*Primary Examiner* — Thomas Tarcza
*Assistant Examiner* — Edward Pipala
(74) *Attorney, Agent, or Firm* — Mori & Ward, LLP

(57) ABSTRACT

An electric vehicle includes a drive motor, an air conditioning system, an electric storage device, and a power consumption controller. The drive motor is to generate drive force for the electric vehicle. The electric storage device is to supply power to the drive motor and the air conditioning system. The power consumption controller is configured to control power consumption of the drive motor and the air conditioning system to limit the power consumption of the drive motor while securing preset power consumption of the air conditioning system and to keep securing power for the air conditioning system through limitation of the power consumption of the drive motor until driving of the drive motor is stopped if a remaining charge of the electric storage device approaches zero with consumption of power by the drive motor.

10 Claims, 5 Drawing Sheets

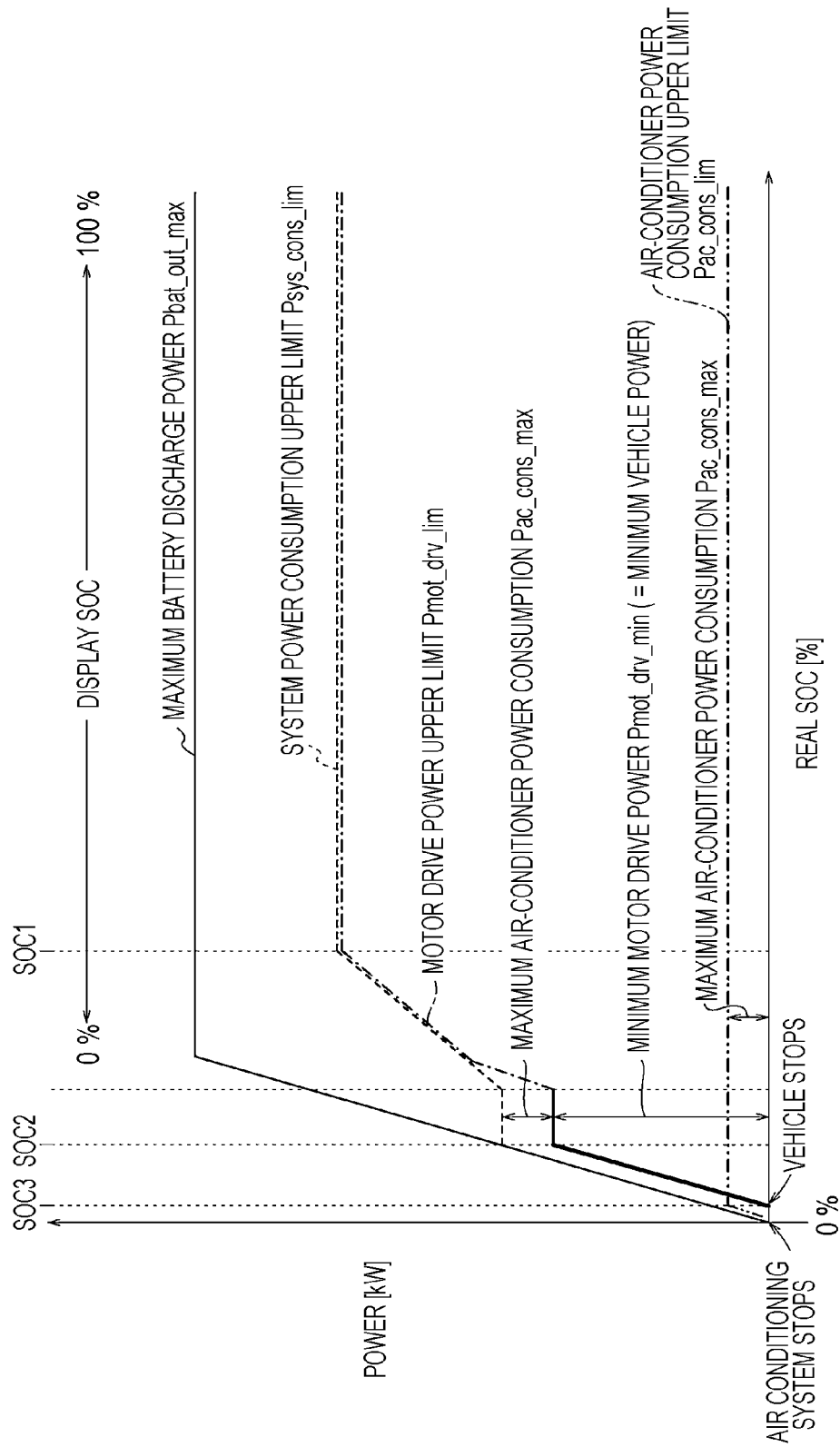

ELECTRIC VEHICLE

CROSS-REFERENCE TO RELATED APPLICATIONS

The present application claims priority under 35 U.S.C. §119 to Japanese Patent Application No. 2011-269903, filed Dec. 9, 2011, entitled "Electric Vehicle." The contents of this application are incorporated herein by reference in their entirety.

BACKGROUND OF THE INVENTION

1. Field of the Invention

The present disclosure relates to an electric vehicle.

2. Discussion of the Background

There are proposed techniques of controlling the power of an air conditioner according to the relation between the output and the remaining charge of a battery (see, for example, Japanese Unexamined Patent Application Publication Nos. 4-368216, 5-032121 and 8-205302).

The technique disclosed in Japanese Unexamined Patent Application Publication No. 4-368216 is intended to inhibit activation of an air conditioner from stopping a vehicle to a standstill before the vehicle reaches a goal. To achieve the intention, according to the technique disclosed in Japanese Unexamined Patent Application Publication No. 4-368216, a control unit 4 is provided with an air-conditioner output limiting unit 9 that limits the power of an electric compressor 3 when a battery remaining charge detector 8 detects that the remaining charge of the battery is equal to or less than a predetermined value, an air-conditioner output stopping unit 10 that stops the electric compressor 3, a display unit 11 that presents a display to a passenger, or an alarm unit 12 that generates a sound to give a warning to the passenger.

The technique disclosed in Japanese Unexamined Patent Application Publication No. 5-032121 is intended to provide an air conditioner designed to inhibit activation of the air conditioner in an electric vehicle from stopping the vehicle to a standstill before the vehicle reaches a goal. To achieve the intention, according to the technique disclosed in Japanese Unexamined Patent Application Publication No. 5-032121, a control unit 4 is provided with a DC current detector and a battery voltage detector 11, or the DC current detector, the battery voltage detector 11, and a power consumption calculating/detecting unit 12 to detect the power of the air conditioner, and is further provided with an air-conditioner output limiting unit 13 that reduces the number of rotations of an electric compressor when the detected power of the air conditioner exceeds an allowable value, thereby limiting the power of the air conditioner an electric compressor, and an allowance changing unit 9 that changes the allowable value according to the remaining charge of a battery.

The technique disclosed in Japanese Unexamined Patent Application Publication No. 8-205302 is intended to provide an air conditioning system that suppresses reduction in the running distance caused by driving an air conditioner in an electric vehicle as much as possible when the air conditioner is driven, and inhibit the activation of the air conditioner from stopping the vehicle to a standstill before the vehicle reaches a goal. To achieve the intention, according to the technique disclosed in Japanese Unexamined Patent Application Publication No. 8-205302, the air conditioning system is provided with a battery remaining charge detector that detects the remaining charge of a battery, and a power-consumption allowance changing unit that, when a value calculated by the battery remaining charge detector exceeds an allowable value for power consumption of the air conditioner which is determined by the remaining charge of the battery, reduces the number of rotations of an electric compressor to limit the power of the air conditioner by using an air-conditioner output control unit, and increases the number of rotations of an outdoor fan motor to change the allowable value according to the battery remaining charge.

As apparent from the above, the techniques disclosed in Japanese Unexamined Patent Application Publication Nos. 4-368216, 5-032121 and 8-205302 are based on the idea such that the power of the air conditioner (air conditioning system) is limited according to the remaining charge of the battery.

SUMMARY OF THE INVENTION

According to one aspect of the present invention, an electric vehicle includes a drive motor, an air conditioning system, an electric storage device, and a power consumption controller. The drive motor is to generate drive force for the electric vehicle. The electric storage device is to supply power to the drive motor and the air conditioning system. The power consumption controller is configured to control power consumption of the drive motor and the air conditioning system to limit the power consumption of the drive motor while securing preset power consumption of the air conditioning system and to keep securing power for the air conditioning system through limitation of the power consumption of the drive motor until driving of the drive motor is stopped if a remaining charge of the electric storage device approaches zero with consumption of power by the drive motor.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 5 is a diagram illustrating various kinds of values when the flowcharts in FIGS. 3 and 4 are used.

DESCRIPTION OF THE EMBODIMENTS

Figure 1:
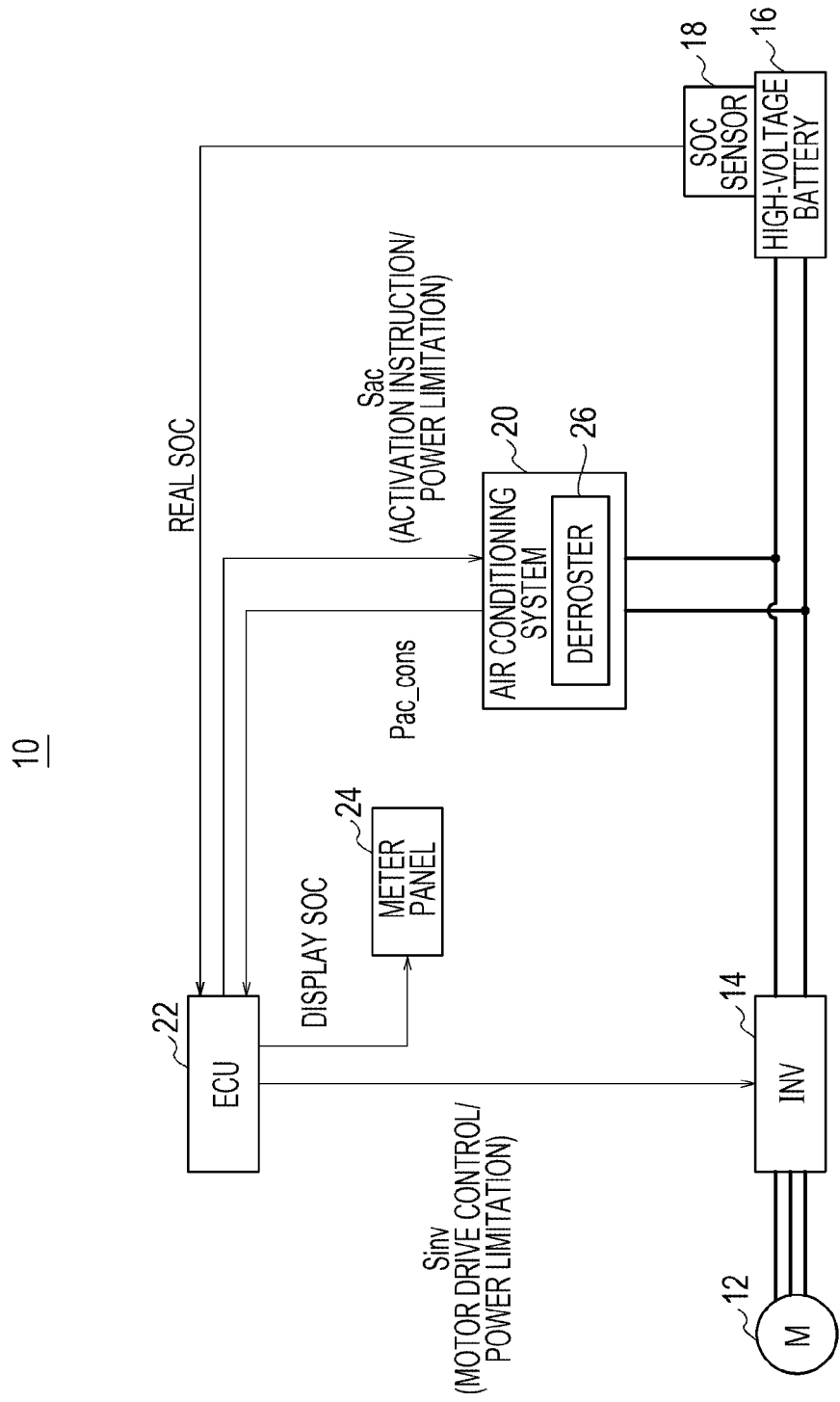
FIG. 1 is a schematic general configurational diagram of an electric vehicle according to an exemplary embodiment of the disclosure.

The embodiments will now be described with reference to the accompanying drawings, wherein like reference numerals designate corresponding or identical elements throughout the various drawings.

A. Exemplary Embodiment

1. Description of General Configuration 1-1. General Configuration

FIG. 1 is a schematic general configurational diagram of an electric vehicle 10 according to the exemplary embodiment of the disclosure. The electric vehicle 10 (hereinafter referred to as "vehicle 10") includes a drive motor 12 (hereinafter referred to as "motor 12"), an inverter 14, a high-voltage battery 16 (hereinafter referred to as "battery 16"), an SOC sensor 18, an air conditioning system 20, an electronic control unit 22 (hereinafter referred to as "ECU 22"), and a meter panel 24.

1-2. Power System

The motor 12 is of a three-phase AC brushless type, and generates drive force [N] for the vehicle 10 (hereinafter referred to as "motor drive force F" or "drive force F") (or torque (N·m)) based on power supplied from the battery 16 via the inverter 14. The motor 12 supplies power (W) generated by regeneration (hereinafter referred to as "regenerated electric power Preg") to the battery 16 to charge the battery 16. The regenerated electric power Preg may be output to an unillustrated auxiliary machine or the like. The motor 12 may take another specification (such as three-phase AC brush type, single-phase AC type, or DC type).

The inverter 14 has a three-phase bridge structure, and converts a DC voltage to a three-phase AC voltage and supplies the AC voltage to the motor 12, and supplies a DC voltage obtained by AC/DC conversion originated from the regeneration operation to the battery 16.

The battery 16 is a electric storage device (energy storage) including a plurality of battery cells, and a lithium ion secondary battery, nickel hydrogen secondary battery, a capacitor or the like, for example, is available as the battery 16. According to the embodiment, a lithium ion secondary battery is used. It is to be noted that a DC/DC (not shown) converter may be provided between the inverter 14 and the battery 16 to boost or step down the output voltage of the battery 16 or the output voltage of the motor 12.

The SOC sensor 18, which is formed by an unillustrated current sensor or the like, detects the remaining charge of the battery 16 (hereinafter referred to as "real SOC") where "SOC" stands for "Stage Of Charge", and sends it to the ECU 22.

1-3. Air Conditioning System 20

The air conditioning system 20 has a capability of regulating the temperature, humidity and cleanliness of air in the vehicle 10, and a capability of defrosting glasses, such as an unillustrated front glass. The air conditioning system 20 has a defroster 26 that carries out the defrosting capability. The defroster 26 includes, for example, a unit that sprays warm wind to the front glass, and heating coils embedded in the front glass, unillustrated side mirrors and head lights. The air conditioning system 20 notifies the ECU 22 of its own power consumption (hereinafter referred to as "air-conditioner power consumption Pac_cons"). The defroster 26 may take another specification (such as a warm-wind spraying type, a type using only heating coils, or a type defrosting only the front glass).

1-4. ECU 22

The ECU 22 controls the inverter 14 using a control signal Sinv to control the power of the motor 12 (motor power), and controls the power of the air conditioning system 20 using a control signal Sac. In executing those controls, the ECU 22 uses the real SOC from the SOC sensor 18, the air-conditioner power consumption Pac_cons from the air conditioning system 20, and outputs from various unillustrated sensors. The ECU 22 has an input/output unit, an operation unit, and a storage unit (none shown).

In a state close to the state where the real SOC is 0% (hereinafter referred to as "power shortage state"), the ECU 22 suitably limits the power of the motor 12 and the power of the air conditioning system 20 using the control signals Sinv, Sac (the details will be given later).

1-5. Meter Panel 24

The meter panel 24 is disposed in front of the driver's seat (not shown) to provide various displays relating to the vehicle 10 (such as the vehicle speed and the charge/discharge state of the battery 16).

2. Control According to Embodiment

Next, the limitation of the powers of the motor 12 and the air conditioning system 20 according to the embodiment will be described.

2-1. Premises

Premises will be described before explaining the details on the limitation of the powers of the motor 12 and the air conditioning system 20.

Figure 2:
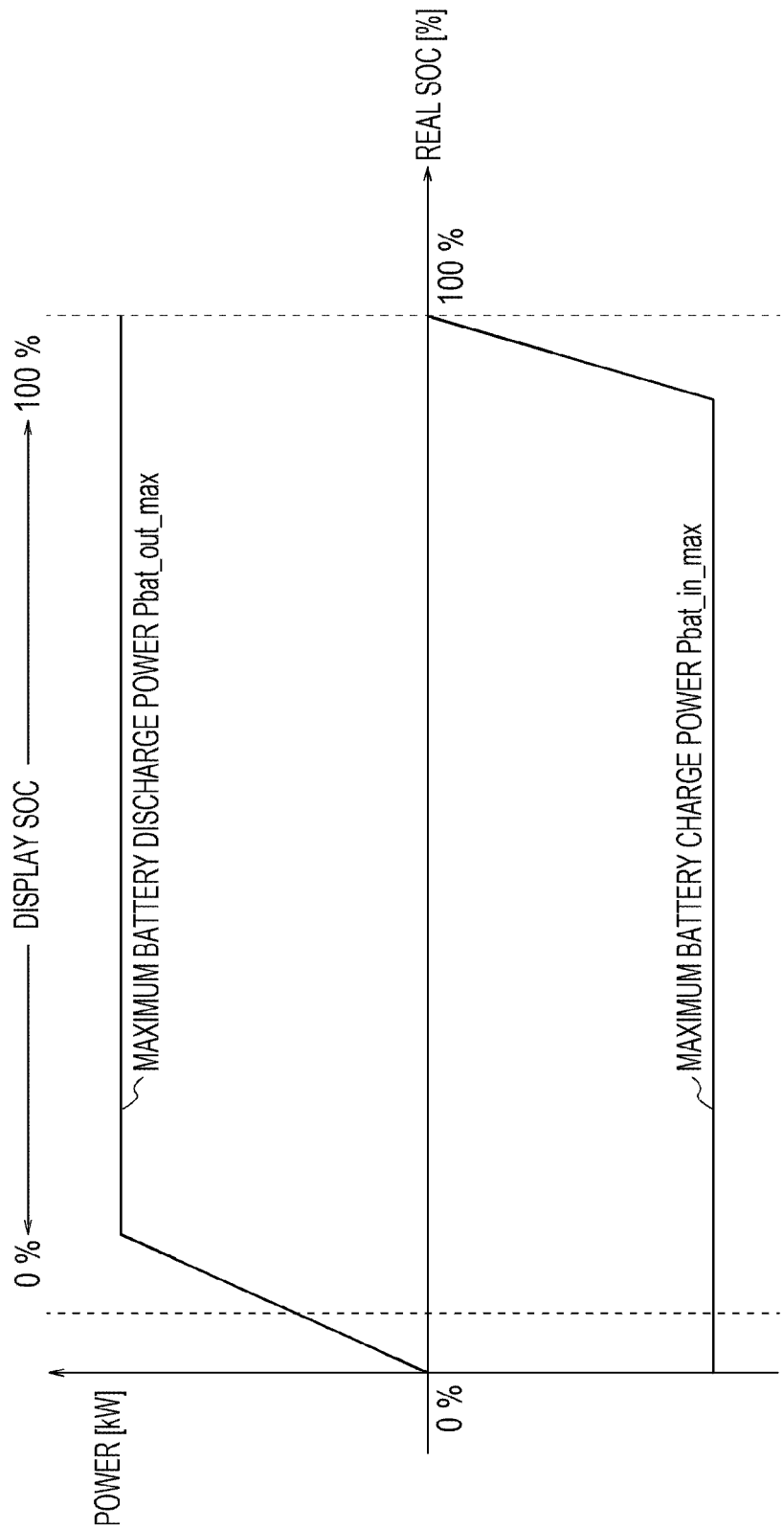
FIG. 2 is a diagram for explaining the charge/discharge characteristics of a high-voltage battery, and values associated therewith.

FIG. 2 is a diagram for explaining the charge/discharge characteristics of the battery 16, and values associated therewith. The abscissa in FIG. 2 represents the real SOC, and the ordinate represents power relating to the battery 16.

According to the embodiment, the real SOC when the power dischargeable by the battery 16 (hereinafter referred to as "maximum battery discharge power Pbat_out_max") is 0 kW is defined as 0(%), and the real SOC when the power chargeable by the battery 16 (hereinafter referred to as "maximum battery charge power Pbat_in_max") is 0 kW is defined as 100(%).

According to the embodiment, a display SOC for informing the driver or the like of the charge/discharge state of the battery 16 is set in addition to the real SOC. As shown in FIG. 2, the display SOC has a predetermined value defined as 0(%) when the real SOC is near the maximum battery discharge power Pbat_out_max, and is defined as 100(%) when the real SOC is the maximum battery charge power Pbat_in_max. Even when the real SOC remains (not zero), therefore, there may be a case where the display SOC is 0(%). This definition is made to indicate the driver of quick charging, for example, when the SOC approaches the power shortage state.

Figure 3:
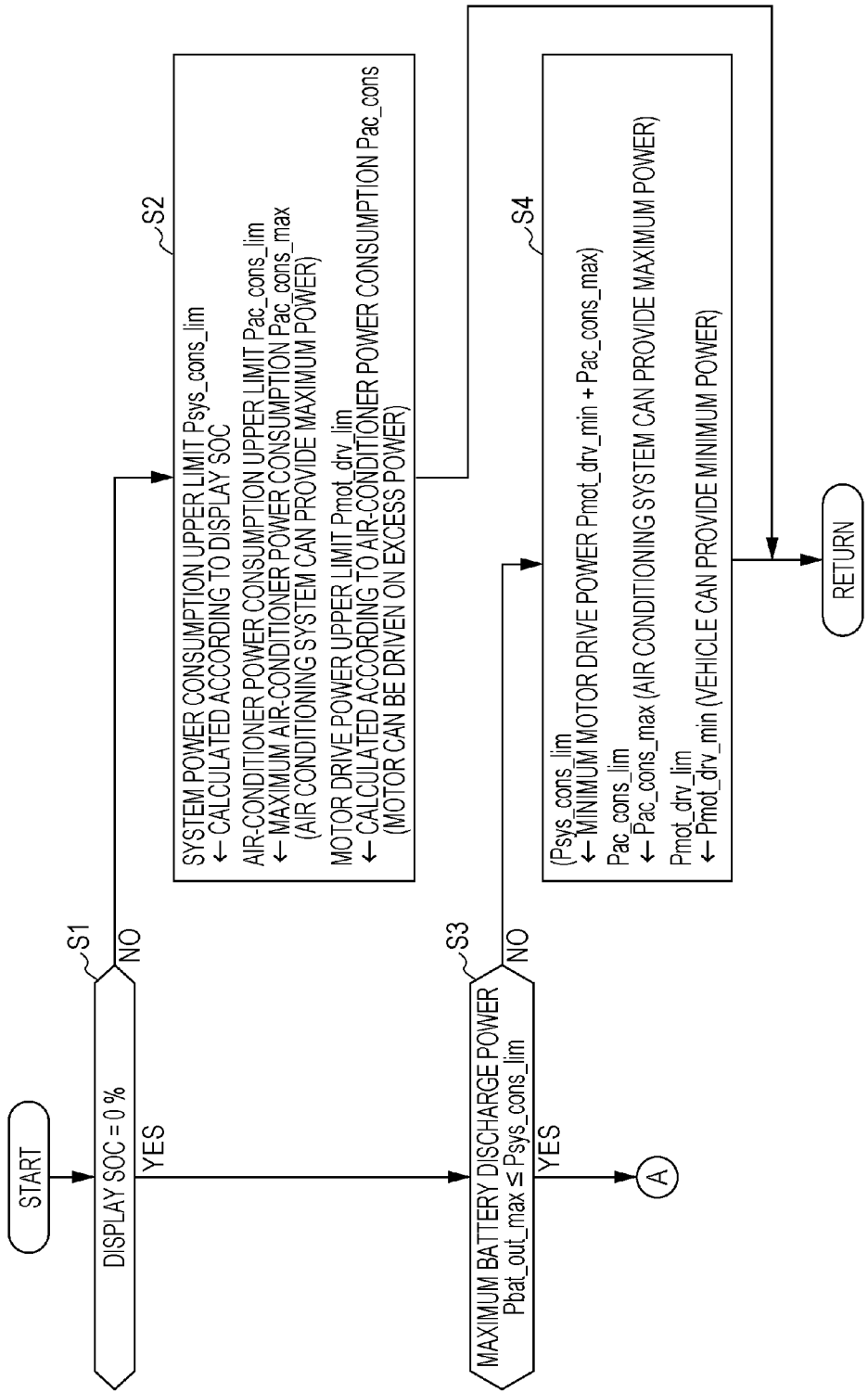
FIG. 3 is a first flowchart for limiting the powers of a drive motor and an air conditioning system according to the exemplary embodiment.
Figure 4:
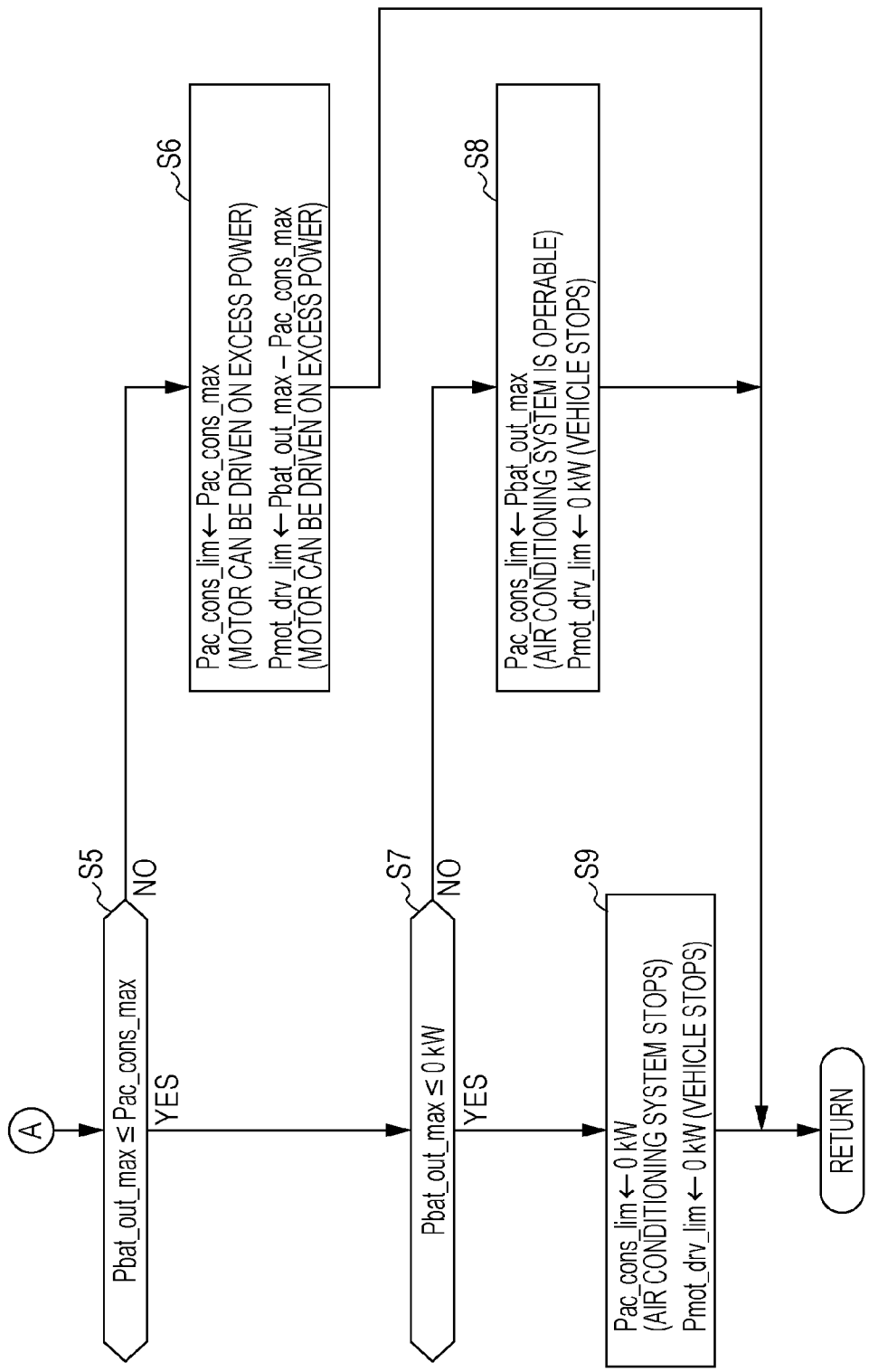
FIG. 4 is a second flowchart for limiting the powers of the drive motor and the air conditioning system according to the exemplary embodiment.

It is to be noted that the display SOC of 0% can be set to any predetermined value at which the real SOC is not 0% and control to be discussed later referring to FIGS. 2 to 4 is feasible. Further, the display SOC of 100% should not necessary coincide with the value when the real SOC is 100%, as long as the real SOC is near 100% with respect to the set value.

2-2. Details of Limiting Outputs of Motor 12 and Air Conditioning System 20

FIGS. 3 and 4 are first and second flowcharts for limiting the powers of the motor 12 and the air conditioning system 20 according to the embodiment. FIG. 5 is a diagram illustrating various kinds of values when the flowcharts in FIGS. 3 and 4 are used.

In step S1 in FIG. 3, the ECU 22 determines whether the display SOC is 0% (see FIG. 5 too). As shown in FIGS. 2 and 5, the display SOC can be calculated in association with the real SOC, and the output from the SOC sensor 18 is used for the real SOC.

When the display SOC is not 0% (S1: NO), it can be said that the real SOC of the battery 16 is remaining comparatively. Accordingly, in step S2, the ECU 22 sets a system power consumption upper limit Psys_cons_lim according to the display SOC. The system power consumption upper limit Psys_cons_lim is set as the upper limit of the sum of the present drive power of the motor 12 (hereinafter referred to as "motor drive power Pmot_drv") and the present power consumption of the air conditioning system 20 (hereinafter referred to as "air-conditioner power consumption Pac_cons"). As shown in FIG. 5, the system power consumption upper limit Psys_cons_lim is constant when the display SOC is equal to or less than a predetermined value SOC1, and gradually decreases when the display SOC is equal to or greater than 0% and less than the predetermined value SOC1.

In step S2, the ECU 22 sets a maximum air-conditioner power consumption Pac_cons_max as an air-conditioner power consumption upper limit Pac_cons_lim. The air-conditioner power consumption upper limit Pac_cons_lim is set as the upper limit of the present air-conditioner power consumption Pac_cons. The maximum air-conditioner power consumption Pac_cons_max, which is power to be consumed when the power of the air conditioning system 20 is the maximum, is stored in the unillustrated storage unit of ECU 22.

Further, in step S2, the ECU 22 sets a motor drive power upper limit Pmot_drv_lim according to the display SOC (or system power consumption upper limit Psys_cons_lim) and the air-conditioner power consumption Pac_cons. The motor drive power upper limit Pmot_drv_lim is set as the upper limit of the present motor drive power Pmot_drv. The motor drive power upper limit Pmot_drv_lim is set to a value obtained by subtracting the air-conditioner power consumption Pac_cons from the system power consumption upper limit Psys_cons_lim (limit Pmot_drv_lim←Psys_cons_lim—Pac_cons).

As described above, the maximum air-conditioner power consumption Pac_cons_max is set for the air-conditioner power consumption upper limit Pac_cons_lim in step S2. Therefore, with the motor drive power upper limit Pmot_drv_lim defined as above, power to be supplied to the motor 12 within the range of the system power consumption upper limit Psys_cons_lim can be set as the motor drive power upper limit Pmot_drv_lim while ensuring the maximum power of the air conditioning system 20. When the air conditioning system 20 is inactive, for example, the air-conditioner power consumption Pac_cons becomes 0%, and the motor drive power upper limit Pmot_drv_lim becomes equal to the system power consumption upper limit Psys_cons_lim.

In FIG. 5, the motor drive power upper limit Pmot_drv_lim is indicated by a solid line in an area where the display SOC is equal to or less than 0% and is greater than a predetermined value SOC3, and is indicated by a long dashed short dashed line in an area where the display SOC is greater than 0%. The point where the motor drive power upper limit Pmot_drv_lim coincides with the system power consumption upper limit Psys_cons_lim indicates the state where the air-conditioner power consumption Pac_cons is 0%.

When the display SOC is greater than 0% (S1: NO), the display SOC corresponds to the real SOC one to one (see FIG. 5), so that the real SOC may be used instead of the display SOC in this case.

Returning to step S1, when the display SOC is 0% (S1: YES), the ECU 22 determines in step S3 whether the maximum battery discharge power Pbat_out_max is equal to or less than the system power consumption upper limit Psys_cons_lim. This determination corresponds to a determination on whether the SOC lies in an area in FIG. 5 where the display SOC is 0% and the real SOC is equal to or less than a predetermined value SOC2 in FIG. 5.

The maximum battery discharge power Pbat_out_max used in step S3 is calculated according to the real SOC obtained from the SOC sensor 18. The calculation uses a map defining the relation between the real SOC and the maximum battery discharge power Pbat_out_max (see FIG. 5). The system power consumption upper limit Psys_cons_lim used in step S3 is calculated according to the real SOC obtained from the SOC sensor 18. The calculation uses a map defining the relation between the real SOC and the system power consumption upper limit Psys_cons_lim (see FIG. 5).

As shown in FIG. 5, in the area where the display SOC is 0% and the real SOC is greater than the predetermined value SOC2, the map is set beforehand in such a way that the sum of the maximum air-conditioner power consumption Pac_cons_max and a minimum motor drive power Pmot_drv_min becomes the system power consumption upper limit Psys_cons_lim. The minimum motor drive power Pmot_drv_min is the power that is consumed when the power of the motor 12 is the minimum (minimum power needed for the vehicle to drive on a standard road under a predetermined condition), and is stored beforehand in the unillustrated storage unit of the ECU 22. Therefore, the vehicle 10 can drive on the minimum power while securing the maximum power of the air conditioning system 20 in the area where the display SOC is 0% and the real SOC is greater than the predetermined value SOC2.

When the maximum battery discharge power Pbat_out_max is not equal to or less than the system power consumption upper limit Psys_cons_lim in step S3 in FIG. 3 (S3: NO), the real SOC is greater than the predetermined value SOC2 in FIG. 5. In this case, the ECU 22 sets the maximum air-conditioner power consumption Pac_cons_max as the air-conditioner power consumption upper limit Pac_cons_lim in step S4. At this point of time, therefore, the air conditioning system 20 can operate on the maximum power. Further, the ECU 22 sets the minimum motor drive power Pmot_drv_min as the motor drive power upper limit Pmot_drv_lim.

To avoid rapid reduction of the power of the motor 12 the moment the display SOC becomes 0%, when the display SOC approaches 0%, the motor drive power upper limit Pmot_drv_lim can be made to gradually approach the minimum motor drive power Pmot_drv_min as shown in FIG. 5. In this case, a map defining the motor drive power upper limit Pmot_drv_lim should be prepared beforehand according to the display SOC or the real SOC.

Although the system power consumption upper limit Psys_cons_lim is calculated in step S3 as mentioned above, the system power consumption upper limit Psys_cons_lim in step S4 is the sum of the maximum air-conditioner power consumption Pac_cons_max and the minimum motor drive power Pmot_drv_min.

Returning to step S3 in FIG. 3, when the maximum battery discharge power Pbat_out_max is equal to or less than the system power consumption upper limit Psys_cons_lim (S3: YES), the real SOC becomes the predetermined value SOC2 in FIG. 5 or less. In this case, it is determined in step S5 in FIG. 4 whether the maximum battery discharge power Pbat_out_max is equal to or less than the maximum air-conditioner power consumption Pac_cons_max. This determination corresponds to a determination on whether the SOC lies in an area in FIG. 5 where the real SOC is greater than the predetermined value SOC3 in FIG. 5 and less than the predetermined value SOC2. The maximum battery discharge power Pbat_out_max used in step S5 is the one used in step S3.

When the maximum battery discharge power Pbat_out_max is not equal to or less than the maximum air-conditioner power consumption Pac_cons_max (S5: NO), the real SOC is greater than the predetermined value SOC3 in FIG. 5 and less than the predetermined value SOC2. In this case, the ECU 22 sets the maximum air-conditioner power consumption Pac_cons_max as the air-conditioner power consumption upper limit Pac_cons_lim in step S6. Therefore, the air conditioning system 20 is still operable on the maximum power at this time.

In step S6, the ECU 22 sets the difference between the maximum battery discharge power Pbat_out_max and the maximum air-conditioner power consumption Pac_cons_max as the motor drive power upper limit Pmot_drv_lim (Pmot_drv_lim←Pbat_out_max−Pac_cons_max). Because the motor drive power upper limit Pmot_drv_lim in this case is less than the minimum motor drive power Pmot_drv_min, the vehicle 10 gradually decelerates. It is to be noted that the system power consumption upper limit Psys_cons_lim is not calculated in steps S6 to S9 according to the embodiment.

Returning to step S5, when the maximum battery discharge power Pbat_out_max is equal to or less than maximum air-conditioner power consumption Pac_cons_max (S5: YES), the real SOC becomes the predetermined value SOC3 or less. In this case, the ECU 22 determines in step S7 whether maximum battery discharge power Pbat_out_max is equal to or less than 0 kW. In other words, the ECU 22 determines whether the battery 16 is unable to discharge. The maximum battery discharge power Pbat_out_max used in step S5 is the one used in step S3.

When the maximum battery discharge power Pbat_out_max is not equal to or less than 0 kW (S7: NO), the real SOC is greater than 0% and is equal to or less than the predetermined value SOC3 in FIG. 5. In this case, the ECU 22 sets the maximum battery discharge power Pbat_out_max as the air-conditioner power consumption upper limit Pac_cons_lim in step S8. Therefore, the air conditioning system 20 is still operable according to the maximum battery discharge power Pbat_out_max at this time. The ECU 22 also sets the motor drive power upper limit Pmot_drv_lim to 0 kW in step S8. Therefore, the vehicle 10 stops after inertial driving.

Returning to step S7, when the maximum battery discharge power Pbat_out_max is equal to or less than 0 kW (S7: YES), the ECU 22 sets the air-conditioner power consumption upper limit Pac_cons_lim to 0 kW in step S9. Therefore, the air conditioning system 20 stops thereafter. The ECU 22 also sets the motor drive power upper limit Pmot_drv_lim to 0 kW. Therefore, the vehicle 10 stops or keeps being stopped after inertial driving.

3. Effects of Embodiment

According to the embodiment, as described above, when the real SOC approaches 0% (i.e., just before shortage of power), the power consumption of the motor 12 is limited while securing the preset power consumption for the air conditioning system 20, so that the power for the air conditioning system 20 is kept secured until the point of time when driving of the motor 12 is stopped due to the limitation of the power consumption of the motor 12. More specifically, when the display SOC is greater than 0% and is equal to or less than the predetermined value SOC1, the maximum air-conditioner power consumption Pac_cons_max is set as the air-conditioner power consumption upper limit Pac_cons_lim, and the difference between the system power consumption upper limit Psys_cons_lim and the air-conditioner power consumption Pac_cons is set as the motor drive power upper limit Pmot_drv_lim (S2 in FIG. 3). When the display SOC is 0% and the real SOC is greater than the predetermined value SOC2, the maximum air-conditioner power consumption Pac_cons_max is set as the air-conditioner power consumption upper limit Pac_cons_lim, and the minimum motor drive power Pmot_drv_min is set as the motor drive power upper limit Pmot_drv_lim (S4 in FIG. 3). Further, when the real SOC is greater than the predetermined value SOC3 and is equal to or less than the predetermined value SOC2, the maximum air-conditioner power consumption Pac_cons_max is set as the air-conditioner power consumption upper limit Pac_cons_lim, and Pbat_out_max−Pac_cons_max is set as the motor drive power upper limit Pmot_drv_lim (S6 in FIG. 4). Furthermore, when the real SOC is greater than 0 kW and is equal to or less than the predetermined value SOC3, the maximum battery discharge power Pbat_out_max is set as the air-conditioner power consumption upper limit Pac_cons_lim, and 0 kW is set as the motor drive power upper limit Pmot_drv_lim (S8 in FIG. 4).

Those settings can permit the operation of the air conditioning system 20 to have precedence over driving of the motor 12 just before shortage of power, so that the air conditioning system 20 is operable when the electric vehicle 10 is stopped. This makes it possible to operate the air conditioning system 20 to thereby secure the visibility until the electric vehicle 10 stops.

According to the embodiment, the state where the real SOC exceeds 0% is set as 0% for the display SOC, and after the display SOC becomes 0%, the system power consumption upper limit Psys_cons_lim is set to the sum of the minimum motor drive power Pmot_drv_min (first power consumption) and the maximum air-conditioner power consumption Pac_cons_max (second power consumption), so as to inhibit power greater than the sum from being output from the battery 16 (S4 in FIG. 3).

According to the configuration, the state where a dynamic performance higher than the preset low dynamic performance can no longer be expected due to reduction in real SOC can be displayed as the display SOC of "0%". Therefore, the driver can recognize the limitation on the dynamic performance of the electric vehicle 10 through the display showing that the display SOC is 0% on the meter panel 24 while keeping driving the electric vehicle 10. Further, the power for the air conditioning system 20 is secured while limiting the dynamic performance of the electric vehicle 10 when the display SOC is near 0% (when the display SOC is greater than 0% and is equal to or less than the predetermined value SOC1), so that the driver does not feel awkward about the limitation of the output power originated from the securing of the power for the air conditioning system 20.

According to the embodiment, when the maximum battery discharge power Pbat_out_max is equal to or less than the sum of the minimum motor drive power Pmot_drv_min and the maximum air-conditioner power consumption Pac_cons_max, and the maximum battery discharge power Pbat_out_max is greater than the maximum air-conditioner power consumption Pac_cons_max, the motor drive power upper limit Pmot_drv_lim is limited to a value equivalent to the difference between the maximum battery discharge power Pbat_out_max and the maximum air-conditioner power consumption Pac_cons_max (S6 in FIG. 4). The above configuration makes it possible to secure power needed for the air conditioning system 20 until the end stage of the discharge of the battery 16.

According to the embodiment, when the display SOC exceeds 0%, the difference between the maximum battery discharge power Pbat_out_max and the air-conditioner power consumption Pac_cons is set as the motor drive power upper limit Pmot_drv_lim to limit the power consumed by the motor 12. According to the foregoing configuration, power other than the air-conditioner power consumption Pac_cons which is actually used can be used for driving the motor 12 as compared to the case where the maximum air-conditioner power consumption Pac_cons_max is secured since the stage at which the display SOC exceeds 0% or the predetermined value SOC1, so that the dynamic performance of the electric vehicle 10 can be extracted.

B. Modifications

The scope of the disclosure is not limited to the foregoing embodiment, and may take various configurations based on the contents of the disclosure. For example, the disclosure may take the following configurations.

1. Application Targets

Although the embodiment has been described on the vehicle 10 having a single motor 12 and a single battery 16 by way of example (FIG. 1), which is not restrictive, and the disclosure may be adapted to an electric vehicle which has a drive motor and a regeneration motor separately.

Alternatively, the disclosure may be adapted to a hybrid vehicle having an engine in addition to the motor 12 (particularly when there is no remaining gasoline). Further, the disclosure may be adapted to a fuel cell vehicle having a fuel cell in addition to the motor 12 and the battery 16 (particularly when power generation by the fuel cell is difficult due to shortage of the fuel). Furthermore, the disclosure may be adapted to another mobile unit or movable unit (e.g., aircraft or ship) which supplies to the drive motor and air conditioning system (or defroster) from the same electric storage device, as well as the electric vehicle 10. Moreover, the vehicle 10 is not limited to a four-wheel automobile, but may be a truck, a bus or the like.

2. Limitation of Powers from Motor 12 and Air Conditioning System 20

Although the powers from the motor 12 and the air conditioning system 20 are limited using the flowcharts in FIGS. 3 and 4 according to the embodiment, this control is not restrictive as long as the control includes at least one of the combination of step S1: NO and S2, the combination of step S3: NO and S4, the combination of step S5: NO and S6, the combination of step S7: NO and S8, and the combination of step S7: YES and S9. For example, the difference between the maximum battery discharge power Pbat_out_max and the air-conditioner power consumption upper limit Pac_cons_lim can be set as the motor drive power upper limit Pmot_drv_lim in step S2 in FIG. 3. Alternatively, the difference between the maximum battery discharge power Pbat_out_max and the air-conditioner power consumption upper limit Pac_cons_lim can be set as the motor drive power upper limit Pmot_drv_lim in step S4 in FIG. 3. In step S6 in FIG. 4, 0 kW may be set as the motor drive power upper limit Pmot_drv_lim. Alternatively, 0 kW may be set as the air-conditioner power consumption upper limit Pac_cons_lim in step S8 in FIG. 4.

Although the maximum air-conditioner power consumption Pac_cons_max is set as the air-conditioner power consumption upper limit Pac_cons_lim in step S4 in FIG. 3 and step S6 in FIG. 4 according to the embodiment, this power is not restrictive as long as it can secure the operation of the air conditioning system 20. For example, a value close to the maximum air-conditioner power consumption Pac_cons_max can be set as the air-conditioner power consumption upper limit Pac_cons_lim. Alternatively, the air-conditioner power consumption upper limit Pac_cons_lim may be the maximum power consumption of particularly the defroster 26 the air conditioning system 20, or a value close thereto.

Although the minimum motor drive power Pmot_drv_min is set as the motor drive power upper limit Pmot_drv_lim in step S4 in FIG. 3 according to the embodiment, this power is not restrictive as long as it can secure the operation of the air conditioning system 20. For example, power higher than the minimum motor drive power Pmot_drv_min may be set as the motor drive power upper limit Pmot_drv_lim.

According to one aspect of an exemplary embodiment of the disclosure, an electric vehicle includes a drive motor, an electric storage device that supplies drive power to the drive motor, an air conditioning system that uses power from the electric storage device, and a power consumption control unit that controls power consumption of the drive motor and the air conditioning system, whereby when a remaining charge of the electric storage device approaches zero with consumption of power by the drive motor, the power consumption by the drive motor is limited while securing preset power consumption of the air conditioning system, thereby permitting power for the air conditioning system to be kept secured through limitation of the power consumption of the drive motor until driving of the drive motor is stopped.

According to the aspect of the exemplary embodiment of the disclosure, when the remaining charge of the electric storage device approaches zero (i.e., just before shortage of power), the power consumption by the drive motor is limited while securing the preset power consumption of the air conditioning system, thereby permitting power for the air conditioning system to be kept secured through limitation of the power consumption of the drive motor until driving of the drive motor is stopped. Accordingly, just before shortage of power, the operation of the air conditioning system has precedence over driving of the electric vehicle, so that even when the electric vehicle stops, the air conditioning system is still operable. This makes it possible to operate the air conditioning system until the electric vehicle stops, thereby securing the visibility.

In the electric vehicle according to the aspect of the embodiment, given that a remaining charge greater than a remaining charge which causes power extractable from the electric storage device to become zero is a zero point of a remaining charge for display, after the remaining charge for display becomes zero, the electric storage device may be inhibited from outputting power greater than a sum of first power consumption which the drive motor consumes to demonstrates a preset dynamic performance of the electric vehicle and second power consumption which the air conditioning system consumes to secure a predetermined air-conditioning performance needed to operate the electric vehicle.

According to this configuration of the embodiment, the state where dynamic performance higher than a preset low dynamic performance cannot be expected due to reduction in the remaining charge can be displayed as a zero remaining charge for display. Accordingly, the driver can confirm the limitation of the dynamic performance of the electric vehicle through the remaining charge for display being zero even when keeping driving the electric vehicle. Further, in case of securing power for the air conditioning system while limiting the dynamic performance of the electric vehicle when the remaining charge for display is near zero, the remaining charge for display is displayed by a value near zero, which does not cause the driver to have awkward feeling about the limitation of the output which is originated from the securing of the power for the air conditioning system.

In the electric vehicle according to the aspect of the embodiment, when power dischargeable by the electric storage device is less than a sum of first power consumption which the drive motor consumes to demonstrates a preset dynamic performance of the electric vehicle and second power consumption which the air conditioning system consumes to secure a predetermined air-conditioning performance needed to operate the electric vehicle, the power consumption of the drive motor may be limited to a value equivalent to a difference between the dischargeable power of the electric storage device and the second power consumption.

This configuration of the embodiment can secure power needed for the air conditioning system until the end stage of the discharging of the electric storage device.

In the electric vehicle according to the aspect of the embodiment, when the remaining charge of the electric storage device is greater than a low remaining charge region where power to be consumed by the drive motor is limited while securing the preset power consumption of the air conditioning system, the power consumption of the drive motor may be limited based on actual power consumption of the air conditioning system.

This configuration of the embodiment can permit power other than the power consumption of the air conditioning system which is actually used can be used for driving the drive motor so that the dynamic performance of the electric vehicle can be extracted, as compared to the case where preset power for the air conditioning system is secured at a stage where a large amount of charge is remaining.

Obviously, numerous modifications and variations of the present invention are possible in light of the above teachings. It is therefore to be understood that within the scope of the appended claims, the invention may be practiced otherwise than as specifically described herein.

What is claimed is:

1. An electric vehicle comprising:
   a drive motor to generate drive force for the electric vehicle;
   an air conditioning system;
   an electric storage device to supply power to the drive motor and the air conditioning system; and
   a power consumption controller configured to control power consumption of the drive motor and the air conditioning system, wherein the power consumption controller is configured to secure a preset power consumption of the air conditioning system and to keep securing power for the air conditioning system as a remaining charge of the electric storage device approaches zero by limiting the power consumption of the drive motor until driving of the drive motor is stopped.

2. The electric vehicle according to claim 1,
   wherein a reference remaining charge greater than a remaining charge which causes power extractable from the electric storage device to become zero is set to a zero point of a displayed remaining charge for display,
   wherein the drive motor needs first power consumption to demonstrate a preset dynamic performance of the electric vehicle,
   wherein the air conditioning system needs second power consumption to secure a predetermined air-conditioning performance needed to operate the electric vehicle, and
   wherein the power consumption controller inhibits the electric storage device from outputting power greater than a sum of the first power consumption and the second power consumption after the displayed remaining charge becomes zero.

3. The electric vehicle according to claim 2,
   wherein if dischargeable power of the electric storage device is less than a sum of the first power consumption and the second power consumption, the power consumption controller limits the power consumption of the drive motor to a value equivalent to a difference between the dischargeable power of the electric storage device and the second power consumption.

4. The electric vehicle according to claim 2, further comprising:
   a remaining charge detector configured to detect an actual remaining charge of the electric storage device,
   wherein if the displayed remaining charge is equal to zero and if the actual remaining charge detected by the remaining charge detector is greater than a first remaining charge, the power consumption controller limits the power consumption of the drive motor to the first power consumption and limits the power consumption of the air conditioning system to the second power consumption.

5. The electric vehicle according to claim 4, wherein if the actual remaining charge detected by the remaining charge detector is smaller than or equal to the first remaining charge and greater than a second remaining charge, the power consumption controller limits the power consumption of the drive motor to a value equivalent to a difference between dischargeable power of the electric storage device and the second power consumption and limits the power consumption of the air conditioning system to the second power consumption.

6. The electric vehicle according to claim 1,
   wherein the drive motor needs first power consumption to demonstrate a preset dynamic performance of the electric vehicle,
   wherein the air conditioning system needs second power consumption to secure a predetermined air-conditioning performance needed to operate the electric vehicle, and
   wherein if dischargeable power of the electric storage device is less than a sum of the first power consumption and the second power consumption, the power consumption controller limits the power consumption of the drive motor to a value equivalent to a difference between the dischargeable power of the electric storage device and the second power consumption.

7. The electric vehicle according to claim 1, wherein if the remaining charge of the electric storage device is greater than a low remaining charge region where power to be consumed by the drive motor is limited while securing the preset power consumption of the air conditioning system, the power consumption controller limits the power consumption of the drive motor based on actual power consumption of the air conditioning system.

8. The electric vehicle according to claim 1, wherein the air conditioning system includes a defroster to defrost a glass of the electric vehicle using power of the electric storage device.

9. The electric vehicle according to claim 8, wherein the air conditioning system is provided to adjust condition of air in the electric vehicle using power of the electric storage device.

10. The electric vehicle according to claim 1, wherein the air conditioning system is provided to adjust condition of air in the electric vehicle using power of the electric storage device.

* * * * *